July 17, 1962   L. H. ROTH   3,045,059
BATTERY ADAPTER
Filed Oct. 30, 1959
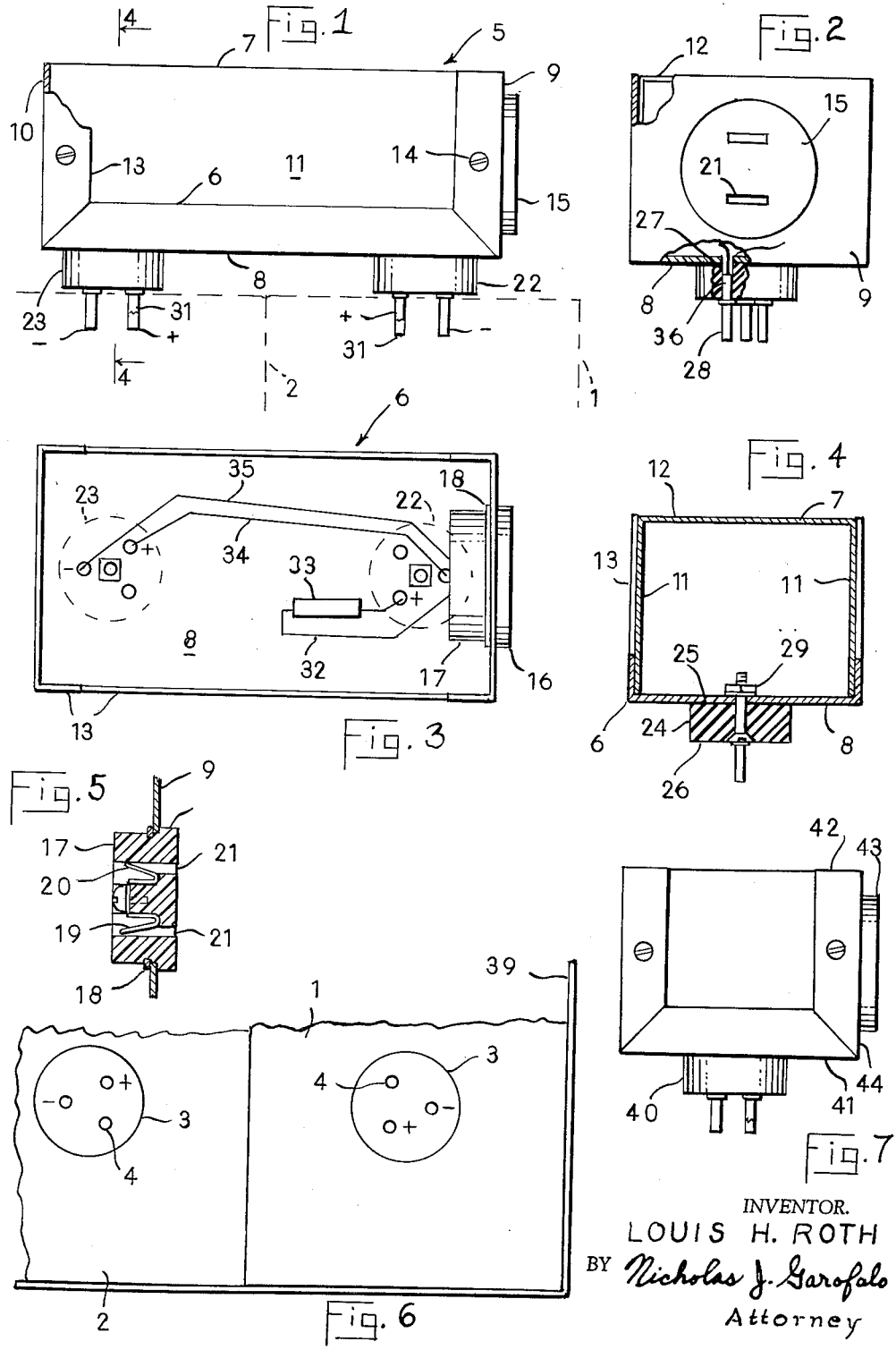
INVENTOR.
LOUIS H. ROTH
BY Nicholas J. Garofalo
Attorney

United States Patent Office 3,045,059
Patented July 17, 1962

3,045,059
BATTERY ADAPTER
Louis H. Roth, 114—67 223rd St.,
Cambria Heights, N.Y.
Filed Oct. 30, 1959, Ser. No. 849,925
2 Claims. (Cl. 136—173)

This invention relates to a plug-in adapter for a dry cell battery supply whereby the voltage of the latter is made available for use of a plug-in electrical instrument.

There is a wide variety of electrical instruments which are operable by the current supplied by dry cell batteries. Each operates best at its rated voltage. For example, certain fluorescent lamp devices used by mineralogists in the field operate at a rating of 58 volts. This is, however, greater than that supplied by the 45 volt "B" battery and less than that supplied by a pair of such batteries connected in series. Hence, it is required that the batteries be connected in series with a suitable resistance to obtain the desired voltage. It is known that this can be done simply by extending wiring from one battery to the other and to the resistance in series. This simple arrangement presents problems of dangling wires, and terminals that twist about, break and loosen. These problems would be present whether there were a series arrangement of several batteries or of a single battery with the resistance.

An object of this invention is to provide a practical and desirable adapter of a plug-in type which can be associated with a battery supply so as to make available a voltage value at a female receptacle to meet the rated voltage of a particular electrical instrument.

Another object of this invention is to provide a practical plug-in adapter for a battery supply whereby voltage of the latter will be available at a female receptacle without external wiring.

A feature of the invention is a container having external male plug means mounted thereon for engagement with a battery supply, and having circuit wiring confined within the container whereby a specific voltage is made available at a female receptacle of the container.

A further feature of the invention is the particular arrangement of the plug means on the container whereby the plug means is engageable in a specific manner with complementary female receptacles of the battery supply.

The invention further lies in the general arrangement and particular organization of its component parts whereby various benefits are provided, as will hereinafter become apparent.

The foregoing as well as other features, objects, and advantages will appear more fully hereinafter from a consideration of the detailed description which follows, taken together with the accompanying drawings wherein an embodiment of the invention is illustrated. It is to be expressly understood, however, that the drawings are for purposes of illustration and description, and are not to be construed as defining the limits of the invention.

In the drawings,

FIG. 1 is an elevational view of the adapter in plugged connection with a pair of batteries, shown in broken line;

FIG. 2 is a right end or front view of the adapter shown in FIG. 1;

FIG. 3 is a top plan view of the base of the container with the cover removed;

FIG. 4 is a cross section taken on line 4—4 of FIG. 1;

FIG. 5 is a view showing the female receptacle of the adapter in section;

FIG. 6 is a fragmentary plan view of a pair of dry cell batteries in their container; and FIG. 7 is a side elevational view of a modified form of the adapter shown in FIG. 1.

Reference is directed to the drawings, and now particularly to FIGS. 1 to 6, wherein there is disclosed two conventional 45 volt dry cell "B" batteries 1 and 2. Each has a flat top surface in which is embedded a female terminal receptacle 3 having terminal holes for each of the terminals of the battery. The positive and negative symbols represent corresponding terminals of the battery, and the terminal hole 4 in each receptacle serves as a guide for a purpose as will hereinafter be explained.

An adapter 5 embodying the present invention is designed to be used to connect the batteries 1 and 2 in series so as to make available a specific operating voltage for an electrical instrument. The adapter includes a container or box comprising a base or shell 6 and a complementary cover 7 slidably engageable with the latter. The shell has an elongated rectangular panel 8 as its bottom, and front and rear panels 9 and 10 upstanding from opposite ends thereof. The cover is of U configuration and defines the side panels 11 and the top panel 12 of the container. Narrow flanges 13 extending from the several panels of the shell 6 overlie marginal portions of the side panels 11 of the cover; and fasteners 14 secure the cover to the flanges.

A female electrical receptacle 15 is mounted in the front panel of the container. This receptacle has an enlarged head 16 abutting the outer face of the front panel, and has a cylindrical body 17 of reduced diameter fitted in a hole of complementary diameter in the front panel. A snap ring 18 engaged in a peripheral groove of the body 17, together with the enlarged head 16, retain the receptacle fast in the front panel.

The receptacle 15 contains the usual pair of leaf spring electrical contacts 19 and 20 which register with male plug receiving slots 21 formed in the head of the receptacle. The contacts 19 and 20 are wired in series with a pair of male battery plugs 22, and 23 mounted to the underface of the bottom panel 8 of the container.

The battery plugs are identical. Each has a thick body 24 formed of electrically non-conductive material, and having flat, parallel top and bottom end faces, designated 25 and 26 respectively. The end face 25 lies flush against the bottom panel 8 of the container. In each plug three metal terminal prongs disposed in parallel relation to each other and in triangular array have their upper portions 27 embedded in the body 24, and their lower portions 28 projecting externally and down from the bottom face of the body 24. The plugs are mounted in a predetermined space relation to each other along the center of the bottom panel 8. Bolt and nut means 29 holds each plug fast to panel 8.

Each male plug has a positive prong, as indicated by the conventional plus symbol; a negative prong, as indicated by the negative symbol; and a guide prong 31. A conductor 32 connects contact 19 of the receptacle 15 with the positive prong of plug 22 through a resistance 33; a conductor 34 connects the negative prong of the latter plug with the positive prong of plug 23; and a conductor 35 connects the negative prong of the latter plug with the other contact 20 of receptacle 15, whereby both plugs, the resistance, and the receptacle 15 are connected in series.

A small hole 36 leads from each prong through the upper face of the related plug and registers with a complementary hole 37 through the bottom panel 8 of the container. These holes allow the different conductors to pass from the interior of the container directly into the bodies of the plugs wherein they are fixed to the associated prongs; thus none of the conductors is externally exposed and the usual problems associated with externally located conductor wires are thus avoided.

The battery plugs 22 and 23 have a predetermined space 38 between them; so that, when the batteries 1 and 2 are placed in juxtaposition as in FIGS. 1 and 6, the prongs of the plug 22 at one end of the container will engage in the corresponding terminal holes of the receptacle of battery 1, and the prongs of the plug 23 at the other end of the container will engage in the corresponding terminal holes of battery 2, whereby the batteries will be connected in series with one another and with the receptacle 15 through the resistance 33. The prongs 31 are electrically dead, and are used only as guides to facilitate engagement of the battery plugs with the battery receptacles 3.

The adapter 5 is especially useful by mineralogists in the field with batteries to provide the 58 volts required by a fluorescent lamp adapted to plug into the receptacle 15. Since this is an important application of the adapter, the resistance 33 is of such value as will drop the combined voltage of 90 volts of the batteries to 58 volts at the receptacle 15 so as to meet the rated voltage of the mineralogist's fluorescent lamp. It is of course understood that the resistance 33 may be replaced with one of another value according to the rated voltage of the instrument to be plugged into the receptacle 15.

The male plugs 22 and 23 have been arranged upon the bottom of the adapter in a predetermined spaced relation so that, as appears in FIG. 1, the batteries are required to be in adjacent relation to each other to enable the male plugs to become engaged in the respective terminal receptacles of the batteries. This arrangement is of advantage, in that it enables the very container 39 in which the batteries are originally packed in pairs to be utilized as a carrier. This feature is of particular advantage to the mineralogist in open field work, as the battery container 39 makes a serviceable carrier for the batteries while the adapter is plugged in the latter.

It is to be noted that the male plugs have been further arranged at the bottom of the adapter so that the prongs of one are in reverse relation to the prongs of the other; and it is to be noted that the batteries 1 and 2, as appears in FIG. 6, have a corresponding relation. This advantageous arrangement enables the adapter to be effectively plugged into the batteries whether it is facing with its ends in one direction or the other. This has an added advantage in permitting easy "blind" plugging of the adapter into the batteries in the dark.

In FIG. 7 is shown a modified form of the adapter shown in in FIG. 1. It is designed for use with a single battery, and accordingly has only one male plug 40 mounted to the bottom panel 41 of a relatively reduced size container 42. There is incorporated in the container a series circuit connecting the male plug in series with the female receptacle 43 mounted in the front wall 44 of the container. A suitable resistance may be contained in series in the circuit according to the rated voltage to be met by the instrument that is to be plugged into the receptacle 43. It is of course understood that the resistance may be omitted from the circuit in the form shown in FIG. 1 as well as from the form shown in FIG. 7.

While an embodiment of the invention has been illustrated and described in detail, it is to be expressly understood that the invention is not limited thereto. Various changes can be made in the design and arrangement of the parts without departing from the spirit and scope of the inventtion, as the same will be understood by those skilled in the art; and it is my intent therefore to claim the invention not only in the form shown and described, but also in all such forms and modifications thereof as can reasonably be construed to fall within the spirit of the invention and the scope of the appended claims.

What is claimed is:

1. A unit of manufacture comprising a pair of separate batteries each having as an integral part thereof a female outlet socket having in triangular array a positive terminal hole, a negative terminal hole and a guide terminal hole; an open top container common to both batteries in which the batteries are slidably received and so disposed that the female outlet sockets thereof are in a predetermined spaced relation to each other; and a separable plug-in adapter comprising a housing, a pair of male plugs fixed to the underside of the housing, each plug having a positive prong, a negative prong, and a guide prong in triangular array corresponding to the array of the terminal holes of one of the female outlet sockets and slidably entered therein, a female output outlet fixed in a wall of the housing, and circuit wiring wholly confied within the housing connecting the positive and negative prongs of the plugs in series with the female output outlet to provide a voltage of a predetermined value available at the female output outlet, the latter being adapted for reception of a double pronged plug, wherein the position of the prongs of one male plug is in reverse relation to the position of the prongs of the other, and the arrangement of the batteries in the container is such that the female sockets of the batteries in the container have a terminal hole array relation corresponding to the array relation of the prongs of the respective male plugs, whereby the adapter is selectively pluggable in the batteries in a reverse direction.

2. The combination as in claim 1, wherein each battery is a 45 volt "B" battery, and a resistance of 22 volts is connected in series in the circuit wiring with the female output outlet and with the batteries to provide an output voltage of 58 volts to accommodate a mineralogist's lamp having a voltage rating of 58 volts.

References Cited in the file of this patent

UNITED STATES PATENTS

| | | |
|---|---|---|
| 1,094,156 | Lowe | Apr. 21, 1914 |
| 1,460,604 | Potter | July 3, 1923 |
| 2,225,460 | Porth | Dec. 17, 1940 |
| 2,352,759 | Baum | July 4, 1944 |
| 2,444,046 | Jacobs | June 29, 1948 |
| 2,445,556 | Bircher | July 20, 1948 |
| 2,649,493 | Temple | Aug. 18, 1953 |
| 2,792,561 | Cohen | May 14, 1957 |

FOREIGN PATENTS

| | | |
|---|---|---|
| 684,110 | Great Britain | Dec. 10, 1952 |